United States Patent
Im et al.

(10) Patent No.: US 10,031,387 B2
(45) Date of Patent: Jul. 24, 2018

(54) LIQUID CRYSTAL DISPLAY COMPRISING FIRST TO FOURTH COLOR FILTERS WHEREIN AT LEAST ONE COLOR FILTER COVERS A CONTACT POINT WHERE FOUR ADJACENT PIXEL AREAS MEET

(71) Applicant: Samsung Display Co., Ltd., Yongin, Gyeonggi-Do (KR)

(72) Inventors: Wan-Soon Im, Cheonan-si (KR); Hyung June Kim, Anyang-si (KR)

(73) Assignee: Samsung Display Co., Ltd. (KR)

( * ) Notice: Subject to any disclaimer, the term of this patent is extended or adjusted under 35 U.S.C. 154(b) by 454 days.

(21) Appl. No.: 14/479,853

(22) Filed: Sep. 8, 2014

(65) Prior Publication Data
US 2015/0301401 A1 Oct. 22, 2015

(30) Foreign Application Priority Data
Apr. 18, 2014 (KR) .......................... 10-2014-0046965

(51) Int. Cl.
G02F 1/1362 (2006.01)

(52) U.S. Cl.
CPC ..................... *G02F 1/1362* (2013.01); *G02F 2001/136222* (2013.01); *G02F 2201/52* (2013.01)

(58) Field of Classification Search
CPC ....... G02F 2001/133726; G02F 1/1362; G02F 2201/52; G02F 2001/136222
See application file for complete search history.

(56) References Cited

U.S. PATENT DOCUMENTS

| | | | |
|---|---|---|---|
| 7,015,506 B2 | 3/2006 | Tokuda et al. | |
| 7,209,198 B2 | 4/2007 | Park et al. | |
| 7,212,262 B2 | 5/2007 | Kang | |
| 7,375,777 B2 * | 5/2008 | Yoshida | G02F 1/133504 349/106 |
| 7,995,163 B2 | 8/2011 | Okumura et al. | |
| 8,040,417 B2 | 10/2011 | Asahi | |
| 8,325,299 B2 | 12/2012 | Ishigaki et al. | |
| 2005/0122445 A1 * | 6/2005 | Park | G02F 1/133514 349/106 |

(Continued)

FOREIGN PATENT DOCUMENTS

| | | |
|---|---|---|
| JP | 11-295717 A | 10/1999 |
| JP | 2005-141267 A | 6/2005 |

(Continued)

*Primary Examiner* — Paul Lee
(74) *Attorney, Agent, or Firm* — Innovation Counsel LLP

(57) ABSTRACT

A liquid crystal display includes: a first substrate on which a plurality of pixel areas are formed; first to fourth color filter layers comprising a plurality of color filters disposed in the pixel areas and having four different colors in four adjacent pixel areas; a plurality of pixel electrodes disposed on the color filter layers corresponding to the respective pixel areas; a second substrate coupled to and facing the first substrate; and a common electrode disposed on one of the first substrate and the second substrate, wherein the first to fourth color filter layers are disposed in a 2×2 matrix, and wherein at least one color filter from among the color filters is wider in a row direction and a column direction of the first substrate than the remaining color filters so as to cover a contact point at which the four adjacent pixel areas meet.

19 Claims, 10 Drawing Sheets

(56) References Cited

U.S. PATENT DOCUMENTS

| | | | | |
|---|---|---|---|---|
| 2005/0134763 | A1* | 6/2005 | Kang | G02F 1/133514 |
| | | | | 349/106 |
| 2006/0139515 | A1* | 6/2006 | Baek, II | G02B 5/201 |
| | | | | 349/106 |
| 2008/0063954 | A1* | 3/2008 | Song | G02B 5/201 |
| | | | | 430/7 |
| 2010/0182549 | A1* | 7/2010 | Miyashita | G02F 1/133514 |
| | | | | 349/106 |
| 2011/0149224 | A1* | 6/2011 | Tseng | G02F 1/136286 |
| | | | | 349/142 |
| 2012/0287506 | A1* | 11/2012 | Yao | G02B 5/201 |
| | | | | 359/491.01 |
| 2012/0326950 | A1* | 12/2012 | Park | G09G 3/3607 |
| | | | | 345/55 |
| 2013/0027646 | A1 | 1/2013 | Cho et al. | |
| 2013/0057812 | A1* | 3/2013 | Kwak | G02F 1/133514 |
| | | | | 349/106 |

FOREIGN PATENT DOCUMENTS

| | | |
|---|---|---|
| JP | 2011-107379 A | 6/2011 |
| JP | 2013-195919 A | 9/2013 |
| KR | 10-2013-0001628 A | 1/2013 |
| KR | 10-2013-0034168 A | 4/2013 |

\* cited by examiner

LIQUID CRYSTAL DISPLAY COMPRISING FIRST TO FOURTH COLOR FILTERS WHEREIN AT LEAST ONE COLOR FILTER COVERS A CONTACT POINT WHERE FOUR ADJACENT PIXEL AREAS MEET

CROSS-REFERENCE TO RELATED APPLICATION

This application claims priority to and the benefit of Korean Patent Application No. 10-2014-0046965 filed in the Korean Intellectual Property Office on Apr. 18, 2014, the entire contents of which are incorporated herein by reference.

BACKGROUND (a) Field

The present disclosure relates to a liquid crystal display, and more particularly, to a liquid crystal display using pixels of the four primary colors.

(b) Description of the Related Art

A liquid crystal display, which is one of the more common types of flat panel displays currently in use, typically includes two sheets of display panels with field generating electrodes (such as a pixel electrode and a common electrode) formed thereon, and a liquid crystal layer interposed therebetween. The liquid crystal display generates an electric field in a liquid crystal layer by applying a voltage to the field generating electrodes. The electric field determines the direction of liquid crystal molecules in the liquid crystal layer, thus controlling polarization of incident light so as to display images.

The liquid crystal display also includes a switching element connected to each pixel electrode, and a plurality of signal lines (such as gate lines and data lines) for applying a voltage to a pixel electrode. The voltage is applied to the pixel electrode by controlling the switching element.

In general, in the liquid crystal display, three colors emitted from three respective pixels are mixed to produce one color, and a desired image is displayed by appropriately controlling the luminance of each pixel. However, in some instances, when an image is displayed using only three color pixels, the light efficiency of the liquid crystal display may deteriorate.

Accordingly, there is a need for a liquid crystal display that can display an image at high resolution and that has improved light efficiency.

The above information disclosed in this Background section is only for enhancement of understanding of the background of the inventive concept and therefore it may contain information that does not form the prior art that is already known in this country to a person of ordinary skill in the art.

SUMMARY

The present disclosure addresses the above need for a liquid crystal display that can display an image at high resolution and that has improved light efficiency.

According to an exemplary embodiment of the inventive concept, a liquid crystal display is provided. The liquid crystal display includes: a first substrate on which a plurality of pixel areas are formed; first to fourth color filter layers, wherein the first to fourth color filter layers comprise a plurality of color filters disposed in the plurality of pixel areas of the first substrate and having four different colors in four adjacent pixel areas; a plurality of pixel electrodes disposed on the color filter layers so as to correspond to the respective pixel areas, and wherein the pixel electrodes are electrically insulated from each other; a second substrate coupled to and facing the first substrate; and a common electrode disposed on one of the first substrate and the second substrate, wherein the first to fourth color filters layers are disposed in a form of a 2×2 matrix, and wherein at least one color filter from among the color filters is wider in a row direction and a column direction of the first substrate than the remaining color filters so as to cover a contact point at which the four adjacent pixel areas meet.

In one embodiment, the plurality of pixel areas may be formed on the first substrate in a matrix form, and the color filters may be repeatedly arranged in the row direction and the column direction of the first substrate.

In one embodiment, the color filters may include a red color filter, a green color filter, a blue color filter, and a white color filter.

In one embodiment, the white color filter may be wider than the remaining color filters.

In one embodiment, the white color filter may be formed in at least a part of an area where color filters of two colors from among the remaining color filters overlap.

In one embodiment, a portion of the white color filter may be formed in a non-display area on the first substrate.

In one embodiment, the liquid crystal display may further include a light blocking member formed on a region of the second substrate corresponding to the non-display area.

In one embodiment, the liquid crystal display may further include a passivation layer formed on an upper surface of a color filter that is positioned at a topmost side of an area where the color filters of three colors overlap.

In one embodiment, the passivation layer may be formed of a transparent conductive oxide.

In one embodiment, the transparent conductive oxide may be formed of a same material as the pixel electrode.

In one embodiment, the red color filter may be wider than the remaining color filters.

In one embodiment, the green color filter may be wider than the remaining color filters.

In one embodiment, the blue color filter may be wider than the remaining color filters.

In one embodiment, in the plurality of pixel areas formed in the row direction and the column direction of the first substrate, the color filter, which is alternately formed at an interval of one pixel area in the row direction and the column direction, may have a larger size than the remaining color filters so as to cover the contact point at which the four adjacent pixel areas meet.

In one embodiment, the liquid crystal display may further include a liquid crystal layer interposed between the first substrate and the second substrate; a first alignment layer formed between the first substrate and the liquid crystal layer; and a second alignment layer formed between the second substrate and the liquid crystal layer.

In one embodiment, the first alignment layer and the second alignment layer may include a reactive mesogen.

According to one or more of the above embodiments of the inventive concept, an area of a color filter formed in a pixel corresponding to a specific color may be increased in a liquid crystal display using pixels of the four primary colors, thereby preventing short-circuit defects between adjacent pixels and light leakage in the area where the pixels of the four primary colors meet.

DETAILED DESCRIPTION

Figure 1:
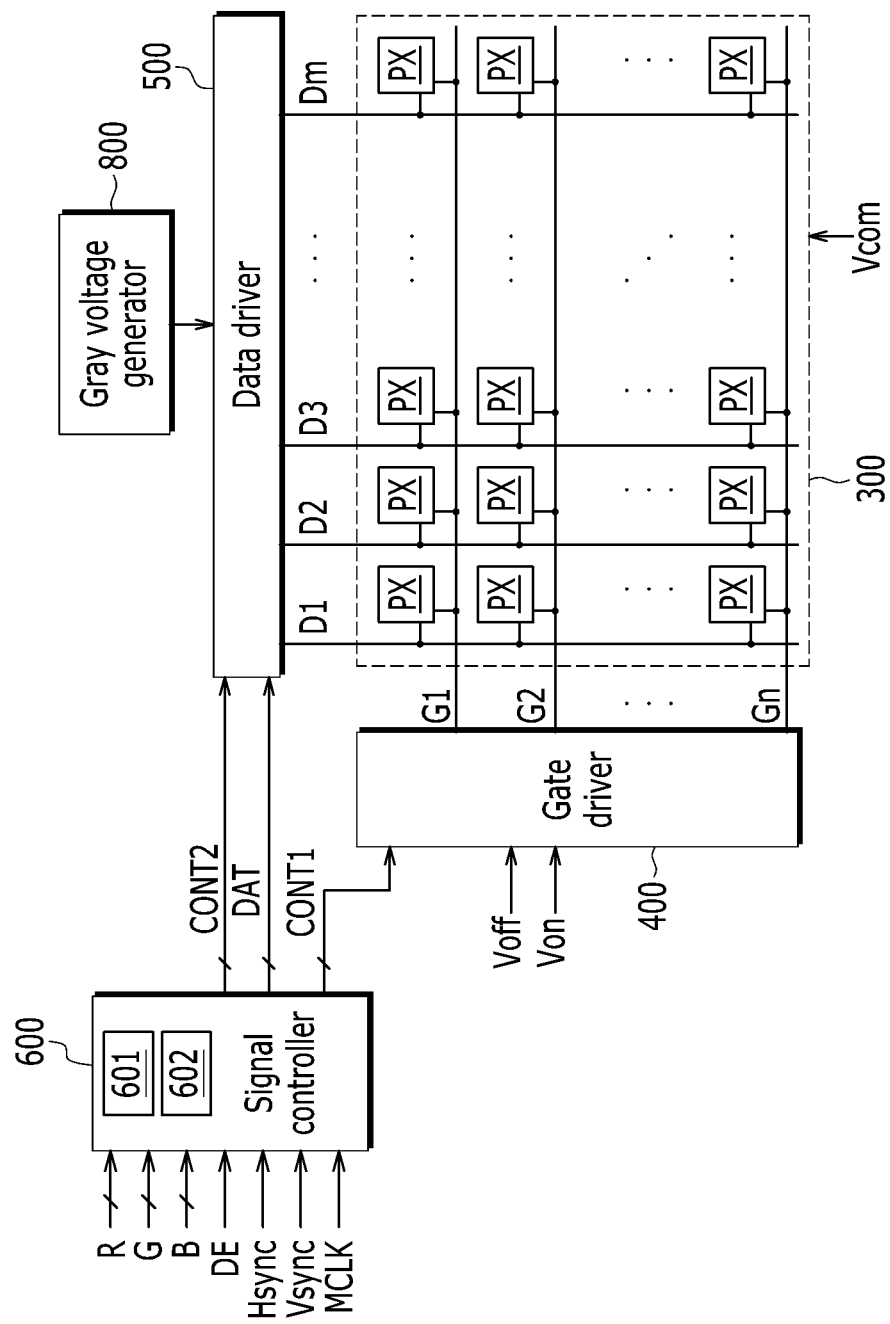
FIG. 1 is a block diagram illustrating a liquid crystal display according to an exemplary embodiment of the inventive concept.

The inventive concept will be described more fully herein with reference to the accompanying drawings, in which exemplary embodiments are shown. As those skilled in the art would realize, the described embodiments may be modified in various different ways without departing from the spirit or scope of the inventive concept.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment of the inventive concept will be described in detail with reference to FIGS. 1 to 3.

Figure 2:
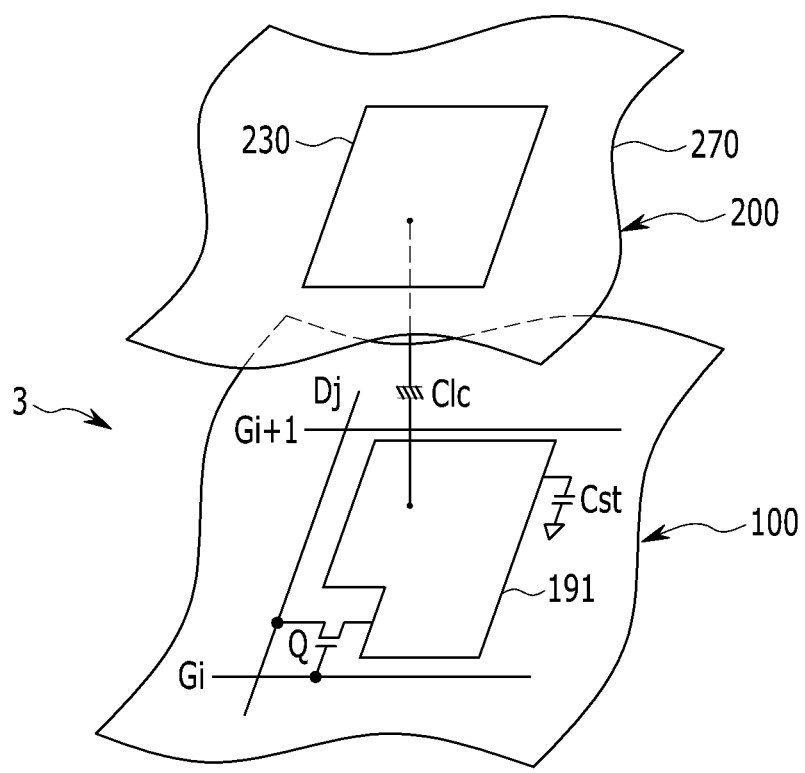
FIG. 2 is an equivalent circuit diagram for a pixel of the liquid crystal display according to an exemplary embodiment of the inventive concept.

FIG. 1 is a block diagram illustrating a liquid crystal display according to an exemplary embodiment of the inventive concept. FIG. 2 is an equivalent circuit diagram for a pixel of the liquid crystal display according to an exemplary embodiment of the inventive concept. FIG. 3 is a pixel layout view of the liquid crystal display according to an exemplary embodiment of the inventive concept.

As illustrated in FIG. 1, the liquid crystal display includes a liquid crystal panel assembly 300, a gate driver 400 and a data driver 500 connected to the liquid crystal panel assembly 300, a gray voltage generator 800 connected to the data driver 500, and a signal controller 600 for controlling the liquid crystal panel assembly 300, the gate driver 400, the data driver 500, and the gray voltage generator 800.

The liquid crystal panel assembly 300 includes a plurality of display signal lines ($G_1$ to $G_n$, and $D_1$ to $D_m$), and a plurality of pixels PX that are connected to the signal lines ($G_1$ to $G_n$ and $D_1$ to $D_m$) and arranged approximately in a matrix form. Referring to the structure illustrated in FIG. 2, the liquid crystal panel assembly 300 includes lower and upper panels 100 and 200 facing each other, and a liquid crystal layer 3 interposed therebetween.

Specifically, the display signal lines include a plurality of gate lines $G_1$ to $G_n$ for transferring a gate signal (referred to as a "scan signal") and a plurality of data lines $D_1$ to $D_m$ for transferring a data signal. The gate lines $G_1$ to $G_m$ extend approximately in a row direction and are parallel with each other, and the data lines $D_1$ to $D_m$ extend approximately in a column direction and are parallel with each other.

Each pixel PX includes a switching element (not illustrated) connected to the display signal lines ($G_1$ to $G_n$ and $D_1$ to $D_m$), and a liquid crystal capacitor Clc and a storage capacitor Cst connected to the switching element. In some embodiments, the storage capacitor Cst may be omitted.

The switching element is a three terminal element (such as a thin film transistor) and may be disposed on the lower panel 100. The switching element includes a control terminal connected to the gate lines $G_1$ to $G_n$, an input terminal connected to the data lines $D_1$ to $D_m$, and an output terminal connected to the liquid crystal capacitor Clc and the storage capacitor Cst.

The liquid crystal capacitor Clc includes two terminals and a dielectric material. A pixel electrode 191 of the lower panel 100 and a common electrode 270 of the upper panel 200 serve as the two respective terminals, and the liquid crystal layer 3 between the two electrodes 191 and 270 serves as the dielectric material. The pixel electrode 191 is connected with a switching element Q, and the common electrode 270 is formed on a front surface of the upper panel 200 and receives a common voltage Vcom. In an alternative embodiment, the common electrode 270 is disposed on the lower panel 100, and at least one of the two electrodes 191 and 270 may be formed having a linear shape or a rod shape.

The storage capacitor Cst which ancillary parts as the liquid crystal capacitor Clc is formed by overlapping a separate signal line (not illustrated) on the lower panel 100 and the pixel electrode 191 with an insulating material (e.g. insulating layer 140) interposed therebetween. A predetermined voltage (such as the common voltage Vcom) is applied to the separate signal line. However, in some other embodiments, the storage capacitor Cst may be formed by overlapping the pixel electrode 191 and a previous gate line (that is disposed above the pixel electrode 191) with the insulating material (e.g. insulating layer 140) interposed therebetween.

To implement a color display, each pixel PX can display one color from among the primary colors (spatial division) or alternately display the primary colors according to time (time division), such that a desired color can be produced by a spatial and/or temporal sum of the primary colors. Examples of the primary colors may include the three primary colors red, green, and blue. When white light is added to the combined light color, the entire luminance is increased. FIG. 2 illustrates an example of spatial division. In FIG. 2, each pixel PX includes a color filter 230 for displaying one of the primary colors. The color filter 230 is disposed in a region of the upper panel 200 corresponding to the pixel electrode 191. In an alternative embodiment, the color filter 230 may be disposed above or under the pixel electrode 191 of the lower panel 100.

Figure 3:
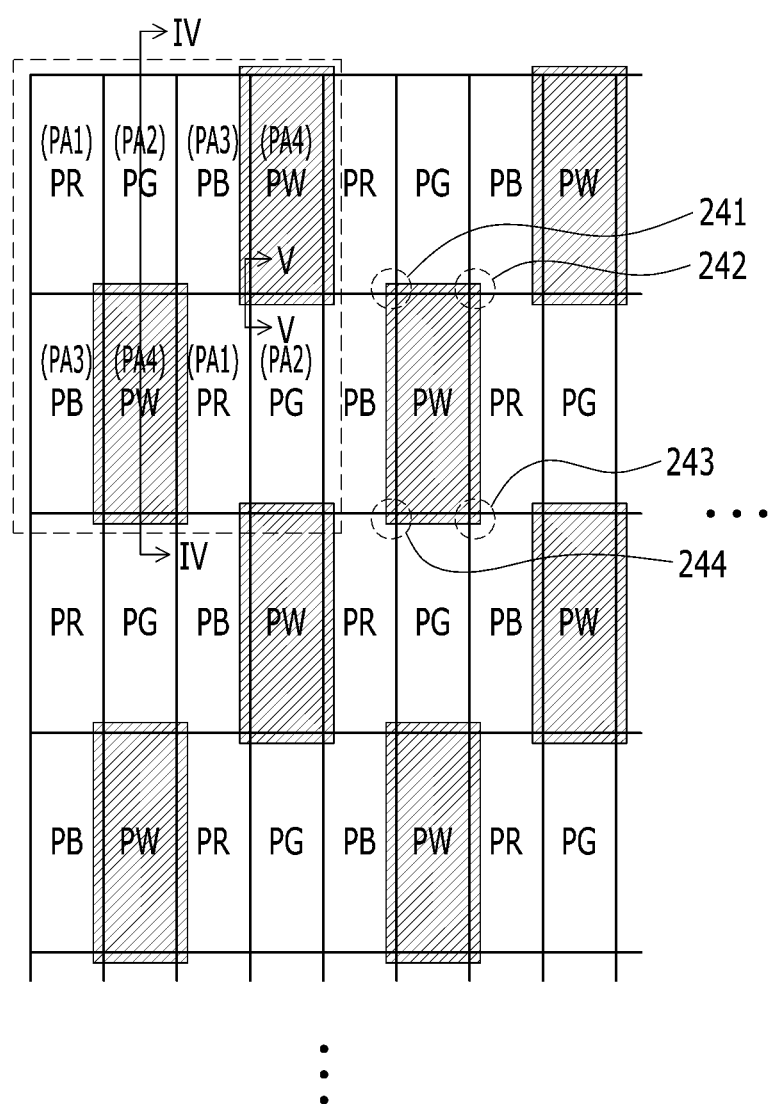
FIG. 3 is a pixel layout view of the liquid crystal display according to an exemplary embodiment of the inventive concept.

Referring to FIG. 3, pixels emitting red, green, blue, and white light (hereinafter, referred to as first to fourth pixel areas PA1, PA2, PA3, and PA4) are arranged in a matrix form. Each of the pixels includes a color filter layer formed of a plurality of color filters PR, PG, PB, and PW disposed on respective pixel areas. That is, the color filters of four colors (PR, PG, PB, and PW having different colors) may be disposed on the four adjacent pixel areas PA1, PA2, PA3, and PA4, respectively. As an example of the inventive concept, the color filters of four colors (PR, PG, PB, and PW) may include red, green, blue, and white color filters.

Referring to the quadrangular box indicated by the dotted line in FIG. 3, a first pixel row (in which the pixels PA1, PA2, PA3, and PA4 including sequentially adjacent red color filter PR, green color filter PG, blue color filter PB, and white color filter PW are disposed) and a second pixel row (in which the pixels PA3, PA4, PA1, and PA2 including the sequentially adjacent blue color filter PB, white color filter PW, red color filter PR, and green color filter PG are disposed) are adjacent to each other. Accordingly, the liquid crystal display according to the exemplary embodiment of the inventive concept has a structure in which a basic unit formed of the first and second pixel rows is repeatedly disposed in a row direction and a column direction.

The color filters PR, PG, PB, and PW are formed as follows. Specifically, a red color filter PR is formed in the first pixel area PA1 by patterning a first photo resist (not illustrated) in which red pigment is mixed. A green color filter PG is formed in the second pixel area PA2 by patterning a second photo resist (not illustrated) in which green pigment is mixed. A blue color filter PB is formed in the third pixel area PA3 by patterning a third photo resist (not illustrated) in which blue pigment is mixed. A white color filter PW is formed in the fourth pixel area PA4 by patterning a fourth white photo resist (not illustrated).

Next, the red, green, blue, and white color filters PR, PG, PB, and PW may be disposed in the first to fourth pixel areas PA1, PA2, PA3, and PA4 in an island form, respectively.

In one embodiment, the white color filter PW (from among the red, green, blue, and white color filters PR, PG, PB, and PW) has a structure that is wider in the row direction and the column direction than the remaining red, green, and blue color filters PR, PG, and PB, so as to cover areas in which the first to fourth pixel areas PA1, PA2, PA3, and PA4 are in contact with each other. A structure of the white color filter PW will be described later in detail with reference to FIGS. 5 and 6.

First, the pixel area of the liquid crystal display according to an exemplary embodiment of the inventive concept will be described in detail with reference to FIG. 4.

Figure 4:
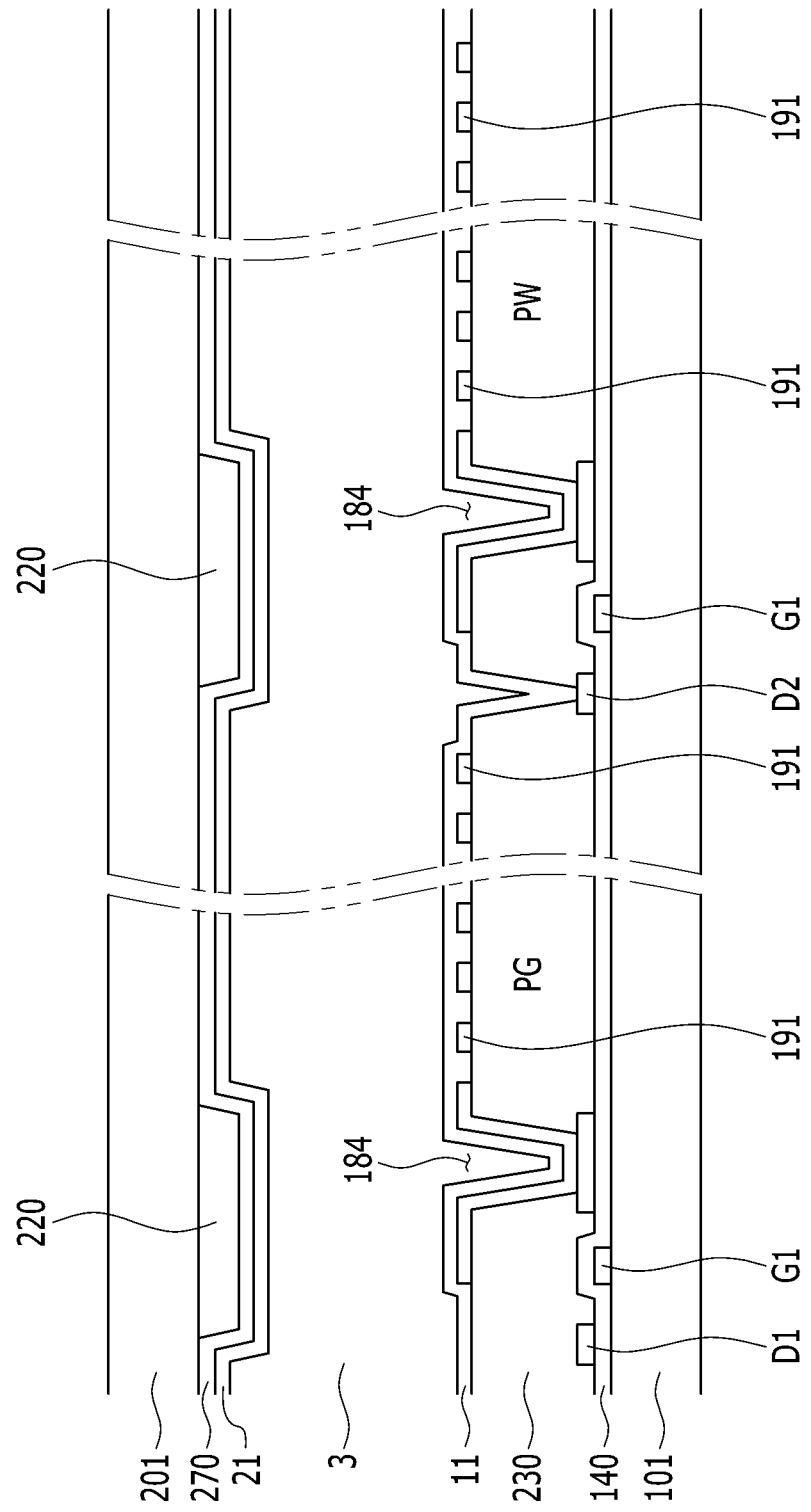
FIG. 4 is a cross-sectional view taken along line IV-IV of FIG. 3.

FIG. 4 is a cross-sectional view taken along line IV-IV of FIG. 3.

Referring to FIG. 4, each pixel area (PA2 and PA4 of FIG. 3) may include at least one thin film transistor TFT and the pixel electrode 191 in addition to the color filter 230. In one embodiment, the pixel electrode 191 of each pixel area may be formed on the color filter 230.

A contact hole 184 is formed in each of the color filters of four colors PR, PG, PB, and PW. Accordingly, the pixel electrode 191 may be electrically connected with the thin film transistor through the contact hole 184.

The liquid crystal layer 3 includes a plurality of liquid crystal molecules having dielectric anisotropy. The liquid crystal molecules are vertically aligned liquid crystal molecules which are arranged between the first substrate 101 and the second substrate 201 in a direction perpendicular to the upper surfaces of the two substrates 101 and 201. When an electric field is applied between the first substrate 101 and the second substrate 201, the liquid crystal molecules rotate in a specific direction between the first substrate 101 and the second substrate 201 so as to allow light to pass through or block light. Specifically, the liquid crystal molecules may rotate such that the liquid crystal molecules lie in a direction parallel to the first substrate 101 or the second substrate 201.

The second substrate 201 is coupled to (and faces) the first substrate 101 with the liquid crystal layer 3 interposed therebetween. The display panel may further include the common electrode 270 disposed on the second substrate 201 and facing the pixel electrode 191. The common electrode 270 may be formed over the second substrate 201. In one embodiment, the common electrode 270 may be formed on the first substrate 101. When the common electrode 270 is disposed on the first substrate 101, the common electrode 270 and the pixel electrode 191 may be electrically insulated from each other.

The display panel may further include a light blocking member 220 interposed between the second substrate 201 and the common electrode 270. The light blocking member 220 may be disposed corresponding to a non-display area of each pixel area. The non-display area is an area in which the thin film transistors and the contact hole are formed in each of the pixel areas PA1, PA2, PA3, and PA4. The non-display area may also be defined as an area where the directions of the liquid crystal molecules of the liquid crystal layer 3 are not controlled.

As illustrated in FIG. 4, the display panel may further include a first alignment layer 11 and a second alignment layer 21 for pre-tilting the liquid crystal molecules of the liquid crystal layer 3. The first alignment layer 11 and the second alignment layer 21 may include a reactive mesogen.

The first alignment layer 11 may be formed between the pixel electrode 191 and the liquid crystal layer 3, and the second alignment layer 21 may be formed between the common electrode 270 and the liquid crystal layer 3.

The reactive mesogen (which may be included in the first alignment layer 11 and the second alignment layer 21) is a material having a property similar to that of a general liquid crystal molecule, and has a structure in which photoreactive monomers are polymerized. The first alignment layer 11 and the second alignment layer 21 including the reactive mesogen may be formed by forming the photoreactive monomers on the pixel electrode 191 and the common electrode 270, and polymerizing the monomers by applying light (such as ultraviolet rays). A polymer formed using the above method may extend in a predetermined direction to pre-tilt the liquid crystal molecules. Accordingly, the liquid crystal molecules of the liquid crystal layer 3 may be pre-tilted at a predetermined angle (for example, about 85° to 90°) by the first alignment layer 11 and the second alignment layer 21. When an electric field is applied to the liquid crystal layer 3, the liquid crystal molecules of the liquid crystal layer 3 which are pre-tilted at the predetermined angle may have a faster response speed than the liquid crystal molecules which are not pre-tilted.

Next, a structure of the color filter disposed in the pixel area according to an exemplary embodiment of the inventive concept will be described in detail with reference to FIGS. 3 and 5.

Figure 5:
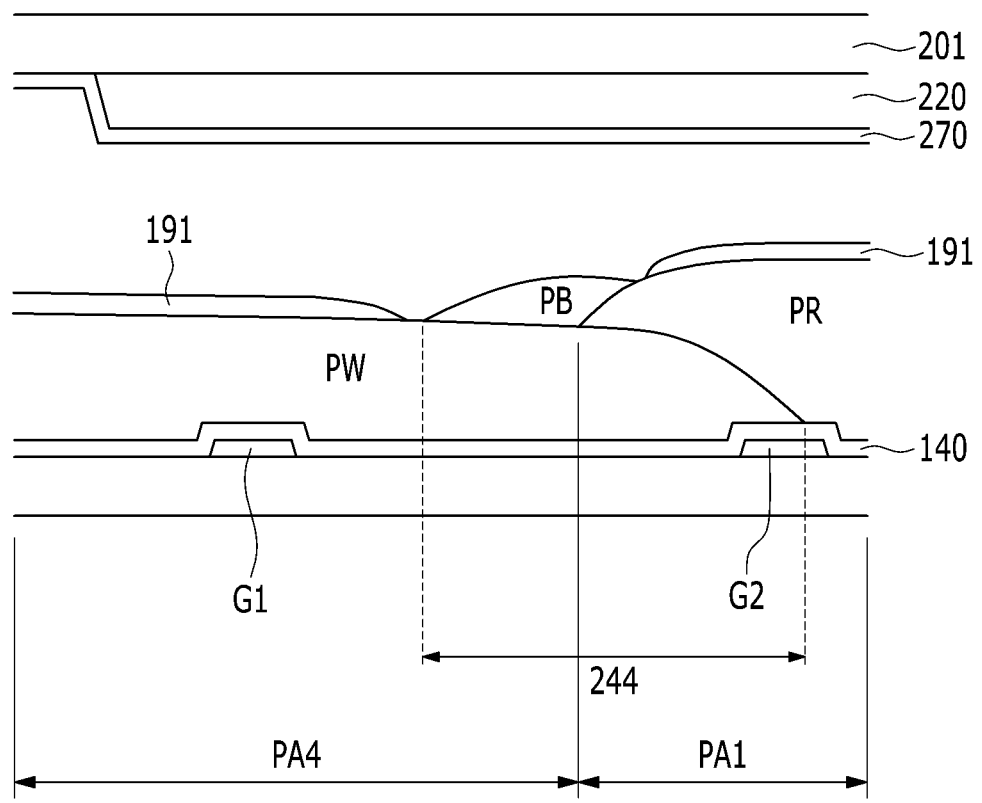
FIG. 5 is a cross-sectional view taken along line V-V of FIG. 3.

FIG. 5 is a cross-sectional view taken along line V-V of FIG. 3.

Referring to FIGS. 3 and 5, the red, green, blue, and white color filters PR, PG, PB, and PW are disposed in each of the first to fourth adjacent pixel areas PA1, PA2, PA3, and PA4, respectively.

The white color filter PW (from among the red, green, blue, and white color filters PR, PG, PB, and PW) has a structure that is wider in the row direction and the column direction than the remaining red, green, and blue color filters PR, PG, and PB so as to cover areas in which the first to fourth pixel areas PA1, PA2, PA3, and PA4 are in contact with each other.

Particularly, the white color filter PW includes first to fourth overlapping portions 241, 242, 243, and 244 so as to cover the areas in which the first to fourth pixel areas PA1, PA2, PA3, and PA4 are in contact with each other (when seen from a plan view).

Further, as shown from the plan view, the first to fourth overlapping portions 241, 242, 243, and 244 may partially overlap the red, green, and blue color filters PR, PG, and PB.

As illustrated in FIG. 5, the white color filter PW includes the fourth overlapping portion 244 extending toward the first pixel area PA1 in the area including a portion in which the first and fourth pixels areas PA1 and PA4 are in contact with each other.

The fourth overlapping portion 244 may partially overlap the red color filter PR, and the red color filter PR may be disposed on the fourth overlapping portion 244. A position of the red color filter PR may be changed depending on the order of manufacturing of the red and white color filters PR and PW. That is, if the red color filter PR is formed prior to the white color filter PW, the fourth overlapping portion 244 may be formed on the red color filter PR.

Since the white color filter PW is primarily formed in the areas of the red color filter PR and the blue color filter PB (which already partially overlap), the blue color filter PB may thus be partially formed on the fourth overlapping portion 244.

Further, the fourth overlapping portion 244 may be formed in the non-display area of the first pixel area PA1 where the light blocking member 220 is formed.

In an embodiment in which the liquid crystal display includes four colors, the color filters partially overlap in the portion where the color filters of two colors are in contact with each other, so as to prevent light leakage or short-circuit between the pixels. However, in the portion where the pixels of the four primary colors are all in contact with each other, a portion is formed without a color filter, and as a result light leakage or short-circuit between the pixels through the portion may occur.

Accordingly, in the liquid crystal display according to the exemplary embodiment of the inventive concept, the white color filter PW is wider than the red, green, and blue color filers PR, PG, and PB in the row direction and the column direction, and the portion where the pixels of the four colors are in contact with each other is covered by the white color filter PW, thereby preventing light leakage or short-circuit between the pixels.

In the portion where the color filters of three colors overlap, a cell gap may be decreased due to a step of the color filter. However, a predetermined height of the cell gap in the portion may be maintained by etching the color filter positioned at the topmost side among the overlapping color filters of three colors and decreasing the step.

Figure 6:
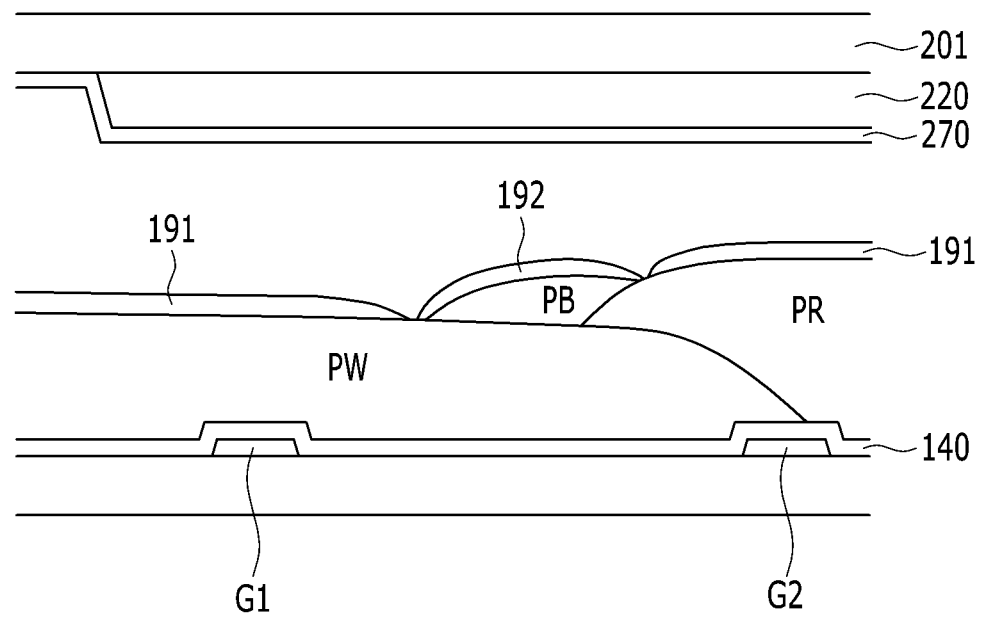
FIG. 6 is a cross-sectional view illustrating a liquid crystal display according to another exemplary embodiment of the inventive concept.

Further, outgassing of the color filter due to the etching of the color filter may be prevented by forming a passivation layer 192 on an upper surface of the color filter. The passivation layer 192 is formed of a transparent conductive oxide. The passivation layer 192 is formed after etching the color filter positioned at the topmost side among the overlapping color filters of three colors, as illustrated in FIG. 6. Here, the transparent conductive oxide may be formed of the same material as the pixel electrode 191.

Next, the pixel layouts of liquid crystal displays according to various different exemplary embodiments of the inventive concept will be described with reference to FIGS. 7 to 10.

FIGS. 7 to 10 are pixel layout views of liquid crystal displays according to various exemplary embodiments of the inventive concept.

The embodiments in FIGS. 7 to 10 are substantially similar to those illustrated in FIG. 3, except the color filter in FIGS. 7 to 10 is formed having a wider area. A repeated description of the similar elements will be omitted.

Figure 7:
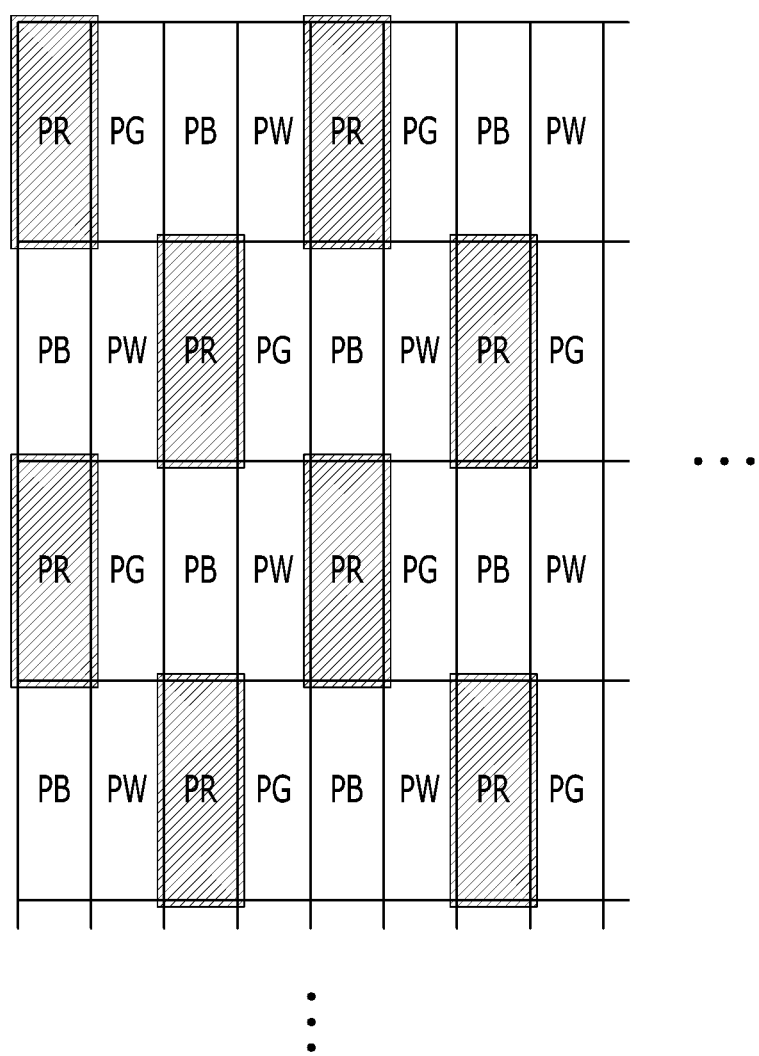
FIGS. 7 to 10 are pixel layout views of liquid crystal displays according to various different exemplary embodiments of the inventive concept.

First, as illustrated in the pixel layout view of FIG. 7, the red color filter PR, but not the white color filter PW, is wider in the row direction and the column direction. Accordingly, in the exemplary embodiment illustrated in FIG. 7, light leakage or short-circuit between the pixels in a portion (where the pixels of the four primary colors are in contact with each other) can be prevented by an overlapping portion of the red color filter PR.

Figure 8:
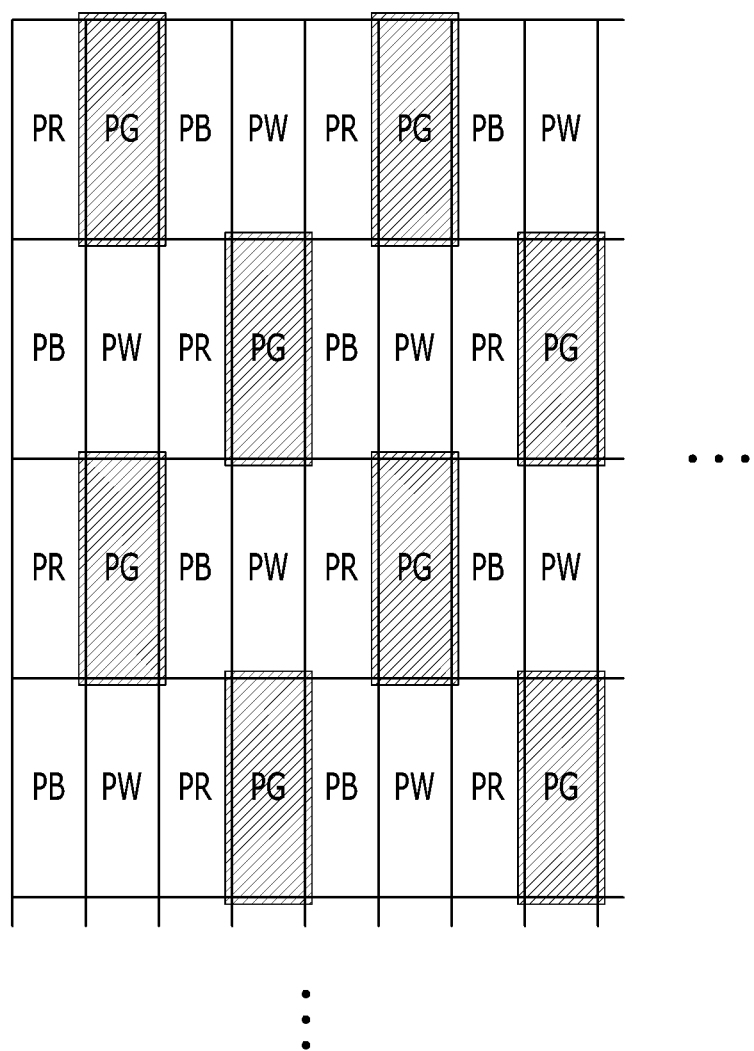

FIG. 8 illustrates the pixel layout view according to another exemplary embodiment of the inventive concept. In the embodiment illustrated in FIG. 8, the green color filter PG (but not the red color filter PR or the white color filter PW) is wider in the row direction and the column direction. Accordingly, in the exemplary embodiment illustrated in FIG. 8, light leakage or short-circuit between the pixels in a portion (where the pixels of the four primary colors are in contact with each other) can be prevented by an overlapping portion of the green color filter PG.

Figure 9:
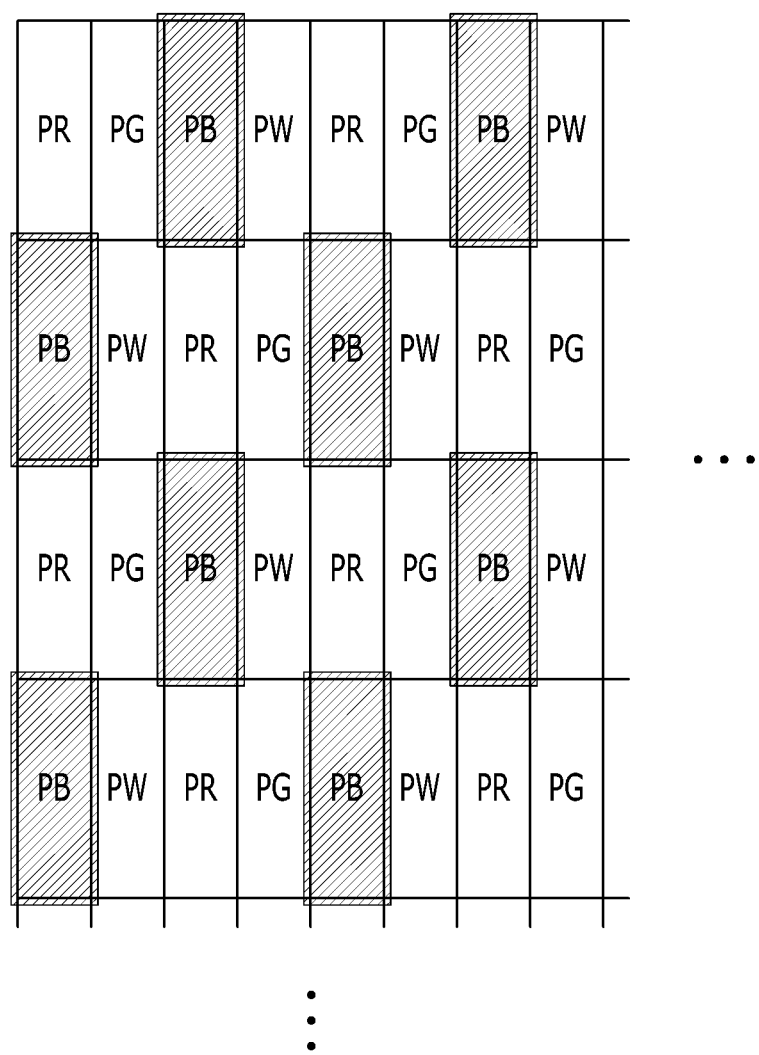

FIG. 9 illustrates the pixel layout view according to another exemplary embodiment of the inventive concept. In the embodiment illustrated in FIG. 9, the blue color filter PB (but not the red, green, and white color filters PR, PG, and PW) is wider in the row direction and the column direction. Accordingly, in the exemplary embodiment illustrated in FIG. 9, light leakage or short-circuit between the pixels in a portion (where the pixels of the four primary colors are in contact with each other) can be prevented by an overlapping portion of the blue color filter PB.

Figure 10:
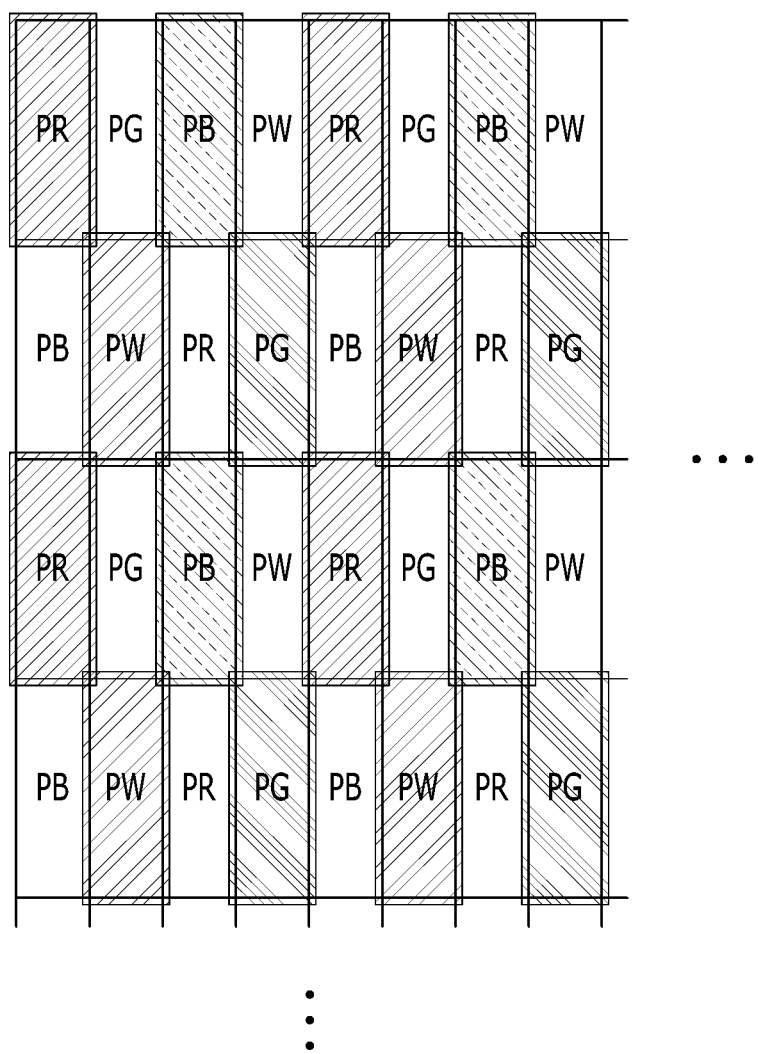

FIG. 10 illustrates the pixel layout view according to another exemplary embodiment of the inventive concept. In the embodiment illustrated in FIG. 10, all of the color filters, which are alternately and repeatedly disposed in the row direction and the column direction at an interval of one pixel, are wider in the row direction and the column direction. When all of the color filters, which are adjacent to each other in the row direction and the column direction, have wider structures, there may be a section in which the color filters of all four colors overlap. In this case, it may be difficult to have the cell gap at a predetermined height because a step due to the color filters of all four colors is increased at the overlapping portion between the color filters, such that the color filters are alternately and repeatedly formed wider at an interval of one pixel in the row direction and the column direction.

According to the exemplary embodiments of the inventive concept, an area of a color filter formed in a pixel corresponding to a pixel of a specific color may be increased in the liquid crystal display using the pixels of the four primary colors, thereby preventing short-circuit defects between adjacent pixels and light leakage in the area where the pixels of the four primary colors meet.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A liquid crystal display, comprising:
   a first substrate on which a plurality of pixel areas are formed;
   first to fourth color filter layers, wherein the first to fourth color filter layers comprise a plurality of color filters disposed in the plurality of pixel areas of the first substrate and having four different colors in four adjacent pixel areas;

a plurality of pixel electrodes disposed on the color filter layers so as to correspond to the respective pixel areas, and wherein the pixel electrodes are electrically insulated from each other;

a second substrate coupled to and facing the first substrate; and a common electrode disposed on one of the first substrate and the second substrate, wherein the first to fourth color filter layers are disposed in a form of a 2×2 matrix, wherein the first to fourth color filter layers have a rectangular shape in a plane parallel to a plane of the first substrate, and wherein at least one color filter from among the color filters is wider in a row direction and a column direction of the first substrate than the remaining color filters so as to cover a contact point at which the four adjacent pixel areas meet.

2. The liquid crystal display of claim 1, wherein:
the plurality of pixel areas are formed on the first substrate in a matrix form, and
the color filters are repeatedly arranged in the row direction and the column direction of the first substrate.

3. The liquid crystal display of claim 2, wherein:
the color filters include a red color filter, a green color filter, a blue color filter, and a white color filter.

4. The liquid crystal display of claim 3, wherein:
the white color filter is wider than the remaining color filters.

5. The liquid crystal display of claim 4, wherein:
the white color filter is formed in at least a part of an area where color filters of two colors from among the remaining color filters overlap.

6. The liquid crystal display of claim 5, wherein:
a portion of the white color filter is formed in a non-display area on the first substrate.

7. The liquid crystal display of claim 6, further comprising:
a light blocking member formed on a region of the second substrate corresponding to the non-display area.

8. The liquid crystal display of claim 5, further comprising:
a passivation layer formed on an upper surface of a color filter that is positioned at a topmost side of an area where the color filters of three colors overlap.

9. The liquid crystal display of claim 8, wherein:
the passivation layer is formed of a transparent conductive oxide.

10. The liquid crystal display of claim 9, wherein:
the transparent conductive oxide is formed of a same material as the pixel electrode.

11. The liquid crystal display of claim 3, wherein:
the red color filter is wider than the remaining color filters.

12. The liquid crystal display of claim 11, wherein:
the red color filter is formed in at least a part of an area where color filters of two colors from among the remaining color filters overlap, and
a portion of the red color filter is formed in a non-display area on the first substrate.

13. The liquid crystal display of claim 3, wherein:
the green color filter is wider than the remaining color filters.

14. The liquid crystal display of claim 13, wherein:
the green color filter is formed in at least a part of an area where color filters of two colors from among the remaining color filters overlap, and
a portion of the green color filter is formed in a non-display area on the first substrate.

15. The liquid crystal display of claim 3, wherein:
the blue color filter is wider than the remaining color filters.

16. The liquid crystal display of claim 15, wherein:
the blue color filter is formed in at least a part of an area where color filters of two colors from among the remaining color filters overlap, and
a portion of the blue color filter is formed in a non-display area on the first substrate.

17. The liquid crystal display of claim 3, wherein:
in the plurality of pixel areas formed in the row direction and the column direction of the first substrate:
the color filter, which is alternately formed at an interval of one pixel area in the row direction and the column direction, has a larger size than the remaining color filters so as to cover the contact point at which the four adjacent pixel areas meet.

18. The liquid crystal display of claim 1, further comprising:
a liquid crystal layer interposed between the first substrate and the second substrate;
a first alignment layer formed between the first substrate and the liquid crystal layer; and
a second alignment layer formed between the second substrate and the liquid crystal layer.

19. The liquid crystal display of claim 18, wherein:
the first alignment layer and the second alignment layer include a reactive mesogen.

* * * * *